(No Model.)
H. W. CARROLL.
VEHICLE WHEEL.
No. 389,499. Patented Sept. 11, 1888.
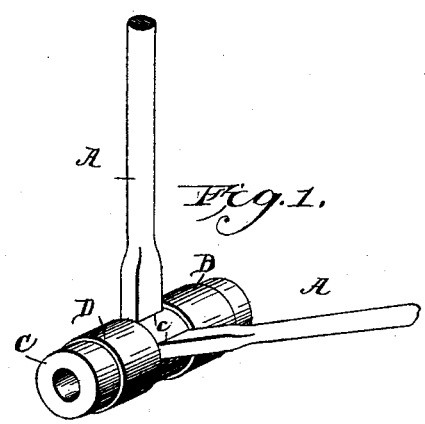
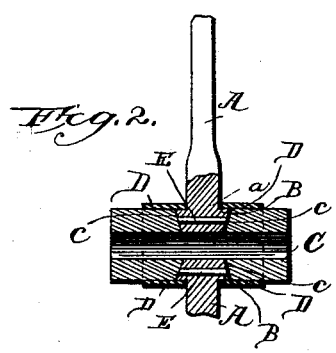
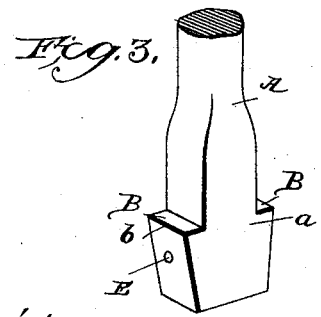
Witnesses
Henry T. Dietrich
E. L. Siggers
Inventor
Henry W. Carroll
By his Attorneys
C. A. Snow & Co.

United States Patent Office.

HENRY W. CARROLL, OF SPARTA, TENNESSEE, ASSIGNOR OF ONE-HALF TO EUGENE HATCH, OF SAME PLACE.

VEHICLE-WHEEL.

SPECIFICATION forming part of Letters Patent No. 389,499, dated September 11, 1888.

Application filed May 17, 1888. Serial No. 274,186. (No model.)

*To all whom it may concern:*

Be it known that I, HENRY W. CARROLL, a citizen of the United States, residing at Sparta, in the county of White and State of Tennessee, have invented a new and useful Improvement in Vehicle-Wheels, of which the following is a specification.

The invention relates to improvements in vehicle-wheels, the object being to bind and clamp the ends of the spokes in the hub-mortises and to prevent them from loosening therein; and it consists in the construction and novel combination of parts hereinafter described, illustrated in the accompanying drawings, and pointed out in the appended claims.

In the drawings, Figure 1 is a perspective view of part of a wheel illustrating the invention. Fig. 2 is a longitudinal sectional view thereof, showing the end of a spoke in a mortise. Fig. 3 is a perspective view of a spoke detached.

Referring to the drawings by letter, A A designate the spokes of a wheel, each having an enlarged portion, $a$, at its inner end.

B B are opposite shoulders, standing at right angles outward from each spoke and forming the outer edges of said enlarged portion, the side edges, $b$, of which converge slightly from said shoulders.

C is the hub, provided with the spoke sockets or mortises $c$, corresponding in size and shape with the said enlarged parts of the spokes (their ends converging inward) and arranged in a circumferential series around the hub.

D D are circular clamping-bands fitted tightly or shrunk upon the hub on each side of and adjoining the spokes, so that the bands together clamp the enlarged portion tightly in place, and all tendency thereof to loosen from the hub is prevented.

The above-described parts would form a flat wheel. To form a dished wheel the shoulders B must form angles other than right angles with the spokes, and the said angles must be equal, but in opposite directions. The sockets must also have suitable inclinations inward from the surface of the hub. These conditions must obviously be fulfilled to cause the spokes to stand inclined to the hub. In all cases it is preferable that the lower edge of the enlarged portions should be parallel with shoulders and that the floor of the corresponding socket should be parallel with the surface of the hub.

If desired, the rivet E may be passed from end to end of the enlarged portion parallel to the shoulders to hold the parts thereof together should splitting occur; but this is not a necessity.

The shoulders B must of course conform to and be flush with the surface of the hub to make close joints with the clamping-bands D.

It should be observed that the ends, but not the sides, of the enlarged portions of the spokes are tapered.

Having described my invention, I claim—

1. In a wheel, the combination of the hub provided with spoke-sockets arranged around it in a circumferential series, the spokes having enlargements corresponding with and fitting tightly in said sockets and forming shoulders on each side of the spokes, which shoulders are flush with the surface of the hub when the enlargements are inserted in the sockets, and the clamping-bands fitted tightly on the hub on each side of and adjoining the spokes, substantially as specified.

2. In a wheel, the combination of the hub provided with spoke-sockets arranged around it in a circumferential series, and with their ends converging inward, the spokes having enlargements fitting into said sockets, the shoulders of which enlargements are flush with the surface of the hub and stand out at right angles to the spokes, and the circumferential clamping-bands fitted tightly upon the hub on each side of and bearing tightly against the spokes and upon the shoulders, substantially as specified.

3. The combination of the hub C, provided with the spoke-sockets $c$, the spokes B, having the enlarged and shouldered inner ends fitted in said sockets, the clamping-bands D, and the rivets E, running from end to end through the enlarged inner ends of the spokes, parallel to the shoulders thereof, before the insertion of the spokes in the sockets, substantially as specified.

In testimony that I claim the foregoing as my own I have hereto affixed my signature in presence of two witnesses.

HENRY W. CARROLL.

Witnesses:
 JOHN PRICE,
 D. G. BROWN.